United States Patent

[11] 3,633,848

| [72] | Inventor | Hans Fimml<br>4, Klausenerstrasse, Innsbruck, Austria |
|---|---|---|
| [21] | Appl. No. | 17,578 |
| [22] | Filed | Mar. 9, 1970 |
| [45] | Patented | Jan. 11, 1972 |
| [32] | Priority | Mar. 17, 1969 |
| [33] | | Austria |
| [31] | | A 2567/69 |

[54] LIFT-PRODUCING MEANS IN WINGED AIRPLANE
4 Claims, 6 Drawing Figs.

[52] U.S. Cl. .................................................. 244/12 B
[51] Int. Cl. .................................................. B64c 29/00
[50] Field of Search .......................................... 244/12

[56] References Cited
UNITED STATES PATENTS

| 2,986,359 | 5/1961 | Tino | 244/12 B |
| 2,945,641 | 7/1960 | Pribram | 244/12 B |
| 3,273,334 | 9/1966 | Tanczos et al. | 244/12 R |

*Primary Examiner*—Milton Buchler
*Assistant Examiner*—Steven W. Weinrieb
*Attorney*—Karl F. Ross ABSTRACT: An engine is operable to burn fuel and produce a working gas. An ejector conduit communicates with an air source and is arranged to receive the working gas and to exhaust it into the interior of the wing means, whereby the working gas entrains air from the source to form a flowing air-gas mixture. A discharge provided on the underside of the wing means is arranged to discharge the air-gas mixture generally in a downward direction.

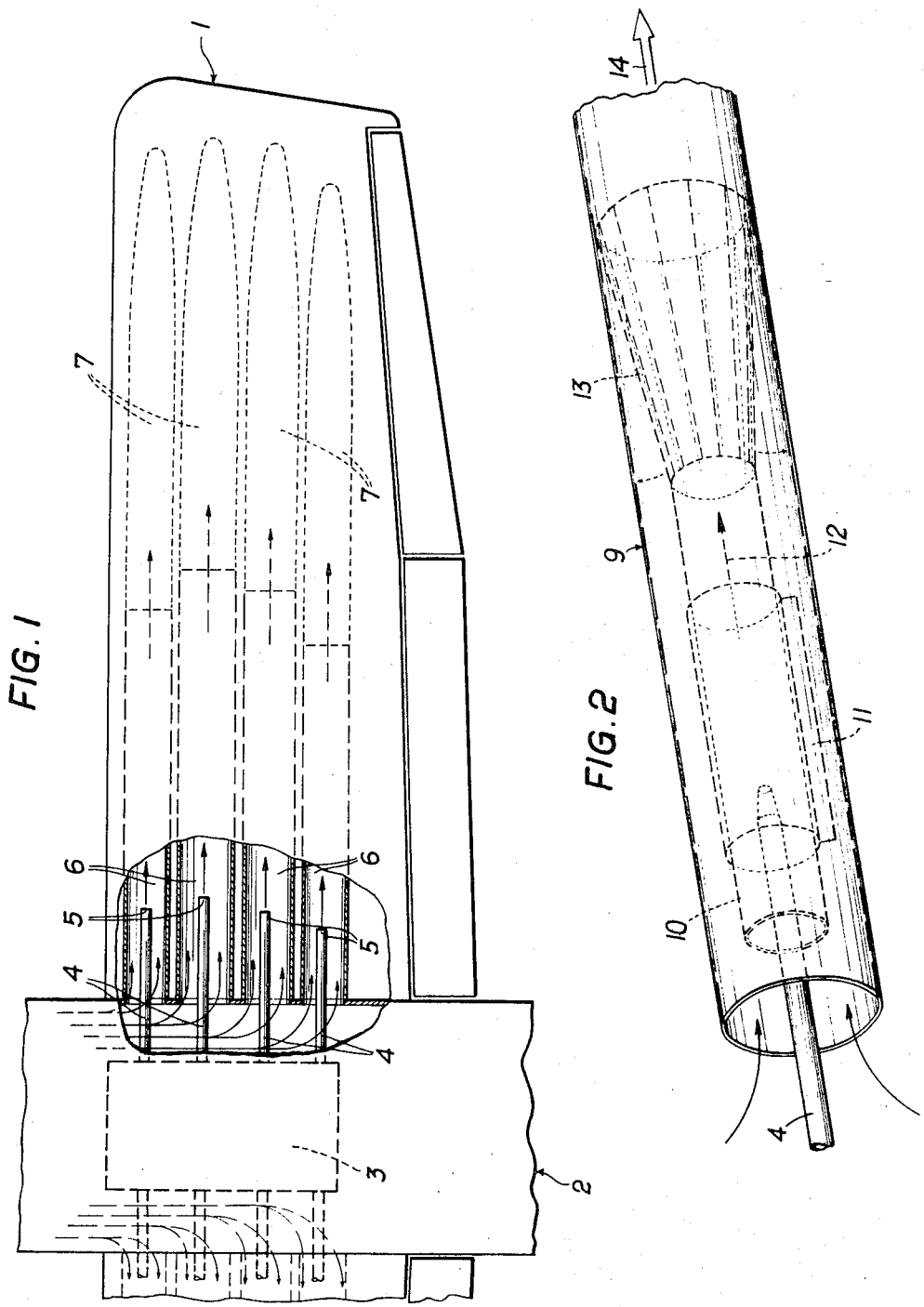

PATENTED JAN 11 1972

HANS FIMML
INVENTOR

BY Karl F. Ross
ATTORNEY

3,633,848

LIFT-PRODUCING MEANS IN WINGED AIRPLANE

FIELD OF THE INVENTION

This invention relates to lift-producing means in airplanes comprising means for producing gas jets, which are discharged from the wings of the airplane and enable a vertical takeoff of the airplane.

BACKGROUND OF THE INVENTION

Whereas it is known that a helicopter can make a vertical takeoff requiring a minimum of power, that advantage is accompanied by some disadvantages which reside particularly in the absence of a wing. Other proposals call for a compromise between a winged airplane and a helicopter e.g., in an airplane having tilting wings, or in an airplane having a wing which is rigidly connected to the fuselage whereas the engines are tiltable or only the jet is deflectable. A disadvantage which is common to all these designs is the relatively high mechanical expenditure and power requirement.

OBJECTS AND SUMMARY OF THE INVENTION

It is an object of the invention to provide simple means which enable a vertical takeoff of an airplane of conventional type with a low power requirement. This object is accomplished in that a fuel-air mixture is continuously or intermittently burnt in one or more engines and the resulting working gases are passed through one or more ejectors and are discharged in known manner through openings provided on the underside of the wing. It is a special advantage of the invention that no reliance is made on additional moving parts, such as tilting engines, rotors, blowers which can be swung out, and the like.

In a second embodiment of the invention, fuel is burnt in the secondary or mixed stream of the primary ejector or ejectors, the accelerated mixed jet from each primary ejector is fed to an associated secondary ejector, and the mixed jet from the secondary ejector or ejectors is discharged through openings provided on the underside of the wing.

DESCRIPTION OF THE DRAWING

Embodiments of the lift-producing means according to the invention are shown diagrammatically and by way of example on the accompanying drawings, in which FIG. 1 is a fragmentary top plan view showing a portion of an airplane provided with lift-producing means according to a first embodiment of the invention.

FIG. 2 is a detail of a second embodiment.

SPECIFIC DESCRIPTION

Figure 3:
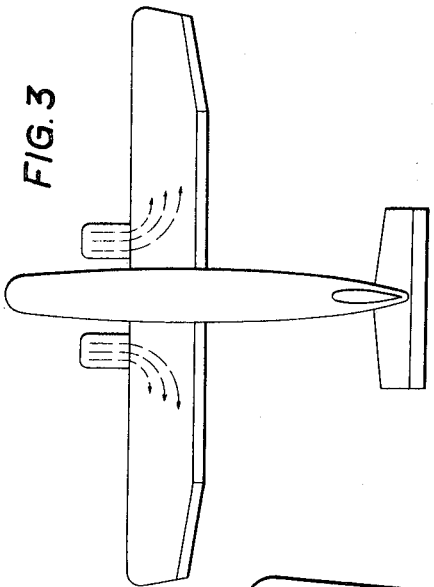
FIGS. 3 and 4 are top plan views showing additional embodiments of airplanes which embody the invention.

In the embodiment shown in FIG. 1, an engine 3 is mounted in the fuselage 2 of an airplane and produces working gas which flows in pipelines 4 to mixing tubes 6, which are accommodated in the wing, Being exhausted through nozzles 5, the working gas entrains air at a high rate. This air is mixed with the working gas jet in the mixing tubes 6. The mixing reduces the temperature of the working gas jet and substantially increases the thrust over that of the nozzle jet alone. The mixture of air and working gas is discharged through a system of openings provided on the underside of the wing in the exhaust area 7.

The performance of these operations, viz, the production of a jet by a nozzle, the admixing of air in the ejector, the exhausting into the interior of the wing and the discharge through the underside of the wing requires a certain overall length, which will be amply available if the components for performing the entire sequence of operations are aligned in the longitudinal direction of the wing, The wing profile and the structural members which are accommodated in the wing may be allowed for if the wing is divided into a plurality of juxtaposed ducts, each of which contains an ejector.

The requirements of an efficient ejector are known. Together with the restriction to the available portions of the cross section of the wing, these requirements govern the longitudinal and transverse sectional shapes of such duct in the region to and immediately behind the ejector. In the succeeding section, the discharge openings on the underside of the wing and a corresponding reduction in cross section required adjacent to said openings will have to be taken into account.

If the airflow is divided among a plurality of ducts, as has been described hereinbefore, and the airflow in each duct can be controlled, it will be possible to control the resultant of the lift in the direction of the depth of the wing profile. Besides, the bank angle of the airplane can be controlled by a restriction or increase of the airflow through each of the two wings.

The working air must be discharged through the underside of the wing at right angles thereto. For this purpose, the longitudinal flow must be reflected through about 90°. Depending on the design of the discharge openings, this deflection may result in a certain pressure rise and the latter may influence the operation of the ejector. To avoid such backpressure effect, an intermittently operating engine may be used. In this case, the frequency of operation of the engine must be selected to match the natural period of vibration of the mass of gas.

When the airplane has lifted off, it must be maintained first in a horizontal attitude. This may be accomplished by the above-mentioned control of the resultant of the lift and may be accomplished more reliably if lift-producing means according to the invention are also provided in the tail. In this case, provision should be made for a controlled discharge in upward and downward directions so that the elevators can be raised and lowered. If the rudder is similarly designed and the above-mentioned control of the bank angle is provided for, the airplane can be turned about all three principal axes.

As soon as an adequate height above the ground has been reached, the airplane may be changed to the attitude for forward flight and will then be controlled in known manner by means of the conventional controls.

Whereas the embodiment shown in FIG. 1 results in an increase in thrust or lift, the engine power required for a vertical takeoff is still rather high compared to the power required for a horizontal takeoff. Because that high power is required only for a short time and any increase in the specific fuel consumption during that time will not be significant, a substantial part of the takeoff thrust may be produced with the aid of means for afterburning additional fuel and a logical development of the concept adopted for an increase of thrust. Such an embodiment is shown in FIG. 2.

As has been mentioned above, the thrust jet which has been produced in the engine is passed through an ejector to entrain fresh air at a rate which depends on the dimensions of the ejector and the rate of flow of the working gas. In any case, the fresh air can be entrained at a weight rate which is a multiple of the weight rate of the working gas.

In the embodiment shown in FIG. 2, additional fuel is injected into the secondary stream of the primary ejector 10 and is burnt in this secondary stream with the aid of an additional heater 11. The mixed stream 12 is thus accelerated to a high velocity and fed to a secondary ejector in which air is admixed in the mixing tube 9 and the takeoff thrust is thus produced. The secondary ejector consists essentially only of a mixing tube, which is concentrically disposed around the primary ejector 10 and which communicates in an aerodynamically appropriate manner at its inlet end with the outside air and at its outlet end with the discharge openings provided in the underside of the wing. The heat which is produced in the heater 11 is dissipated by the fresh air which is sucked by the secondary ejector and first cools the hot tube wall of the primary ejector 10 adjacent to the heater 11 and also reduces the temperature of the combustion gases in the mixing tube 9 to the mixed temperature. If optimum dimensions are selected for the ejectors, the thrust which can be obtained will depend on the upper-limit of the permissible mixed temperature.

If the engine operates intermittently, the afterburning must be performed at the frequency of the engine and must be initiated by ignitions which are delayed by the time required for the working gas to flow from the engine to the afterburning zone.

Afterburning is no longer required when the airplane has taken off so that the additional heater 11 is then deenergized and only the primary ejector 10 remains in operation and supplies through the secondary ejector the discharge system thereof. If the reduced velocity of the jet entering the mixing tube 9 results in a loss of thrust, this may be avoided by the provision of adjustable sheet metal segments, which can be swung toward the end of the mixing tube to form a diffusorlike transition 13 between the primary ejector 10 and the mixing tube 9 whereas the segments being swung out lie in the wall of the mixing tube. Alternatively, afterburning might be maintained at a lower rate.

The lift-producing means described above comprise flow ducts extending in the longitudinal direction of the wing and an engine arranged generally as shown in FIG. 1. In that case, the working gas is produced by an engine which is mounted in the fuselage and the gas is supplied from that engine to both sides to the left-hand and right-hand wings. The fresh air for the ejectors flows into the interior of the wing from the fuselage or from the region which is closely spaced beside the fuselage. This air might also be used to cool the engine if this is required or desirable in view of the type of engine employed.

Figure 4:
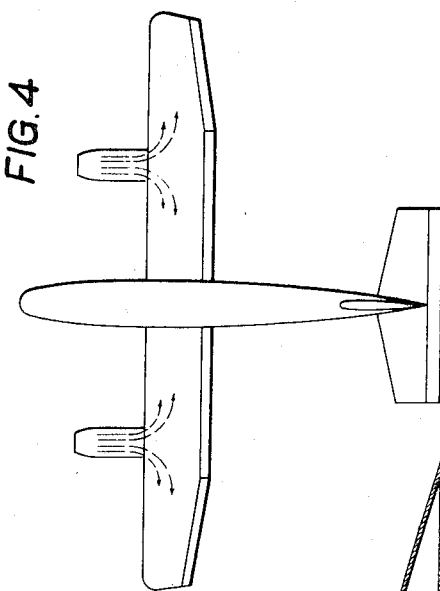

In a twin-engined plane, an analogous arrangement may be adopted, in which the engines are mounted on the wings and supply working gas into the wings in one direction from each engine, as is shown in FIG. 3, or in both directions, as is shown in FIg. 4. If the working gas is supplied only in one direction from each engine (FIG. 3), the arrangement in each wing is generally the same as in FIG. 1. If the working gas is supplied in both directions from each engine (FIG. 4), an arrangement like that of FIG. 1 will be obtained in each of the inner and outer sections of each wing.

Figure 5:
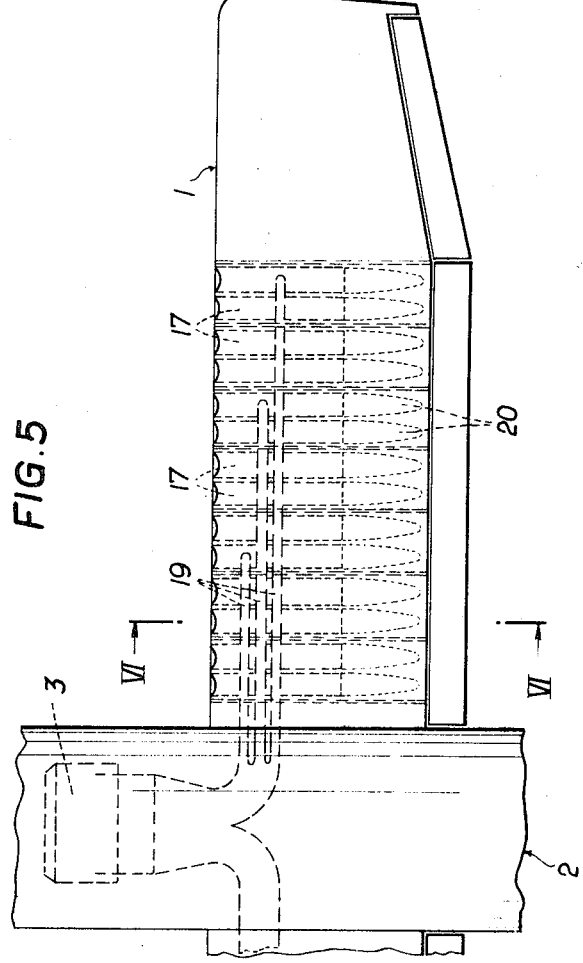
FIG. 5 is a fragmentary top plan view similar to FIG. 1 and shows a further embodiment of the lift-producing means according to the invention.
Figure 6:
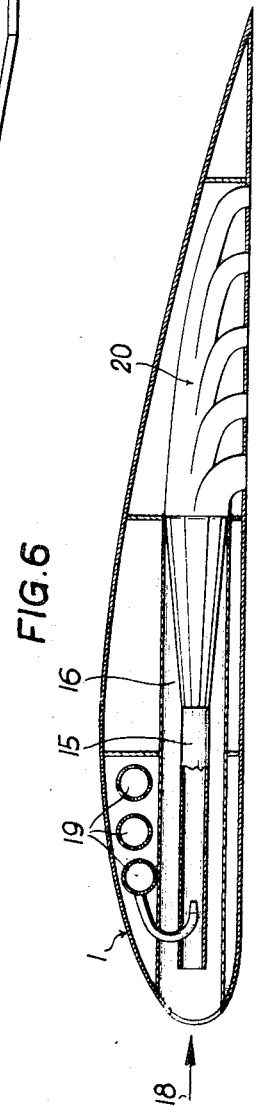
FIG. 6 is an enlarged vertical sectional view taken through a wing of FIG. 5.

Features common to the embodiments described hereinbefore are the ducts extending along the wing so that the airflow rate is limited by the cross section of the wing. The structural parts of the wing and the profile of the wing may permit of a provision of ejectors extending at right angles to the longitudinal direction of the wing, e.g., parallel to the ribs. In this case, the wing length which is available and the profile of the wing impose a limitation as regards the diameter of the ejectors 15, 16. On the other hand, it is shown by way of example in FIGS. 5 and 6 that a relatively large number of ejectors 17 may be provided and may receive air from the leading edge of the wing. The conduit 19 for supplying the working gas may be accommodated adjacent to the strongly curved upper portion of the profile.

In this case, the discharge zones 20 are spaced in the longitudinal direction of the wing so that the direction of the resultant of the lift cannot be controlled. It is apparent from the foregoing description that such control is not required.

The statements made hereinbefore with reference to FIGS. 1 and 2 and multiengined airplanes are also applicable to the embodiment last described and having ejectors extending in the direction of flight.

What is claimed is:

1. An aircraft comprising an airframe having a fuselage and a pair of wings extending laterally from said fuselage and provided with upper and lower aerodynamic skins, said airframe having a flight plane extending through said fuselage and said wings between said aerodynamic skins;
   gas-generating means on said airframe for producing a high-pressure working-gas stream;
   forwardly open intake means formed on said airframe in said plane for inducing the flow of ambient air into said airframe;
   a plurality of downwardly trained outlets formed in said lower aerodynamic skin of said wings;
   respective ducts interconnecting said intake means with each of said outlets, each of said ducts having a portion parallel to said plane; and
   means connected to said gas-generating means and defining in said portions respective ejectors pumps for discharging high-pressure working-gas in said ducts toward said outlets while entraining said ambient air through said portions of said ducts and and mixing same with the working gas in said portions.

2. The aircraft defined in claim 1, further comprising an additional ejector pump along said portions of each of said ducts for afterburning the respective mixture.

3. The aircraft defined in claim 1 wherein said gas-generating means comprises a single engine.

4. The aircraft defined in claim 1 wherein said gas-generating means comprises a plurality of engines.

* * * * *